Dec. 5, 1950 P. J. H. JANSSEN 2,532,720

CATHODE-RAY TUBE CIRCUIT

Filed June 29, 1949

INVENTOR.
PETER JOHANNES HUBERTUS JANSSEN.
BY [signature]
AGENT.

UNITED STATES PATENT OFFICE 2,532,720

CATHODE-RAY TUBE CIRCUIT

Peter Johannes Hubertus Janssen, Eindhoven, Netherlands, assignor to Hartford National Bank and Trust Company, Hartford, Conn., as trustee Application June 29, 1949, Serial No. 102,098
In the Netherlands July 9, 1948

2 Claims. (Cl. 315—27)

This invention relates to circuits for centring the electron-beam in a cathode-ray tube, the beam of which is deflected magnetically.

Circuits of this type are known, for example in television receivers, wherein a sawtooth-shaped deflection current and an additional variable direct current are carried by the deflection coils. The direct current, which usually forms part of the total direct current fed by the supply of the receiver, permits the centring of the beam to be controlled.

Figure 1:
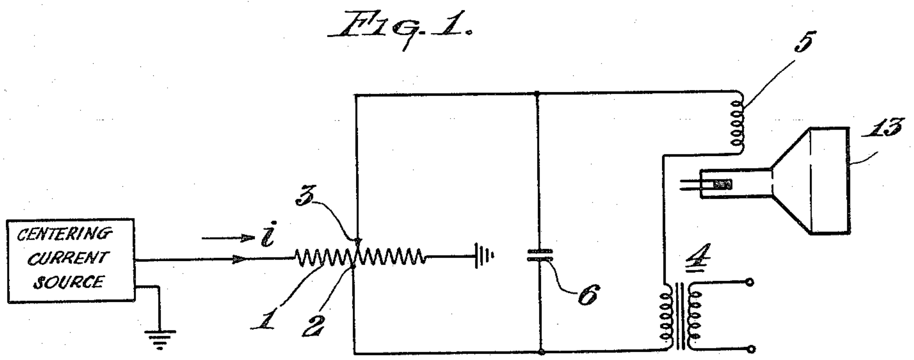

A known circuit of this type, which serves to control the adjustment of the beam in the direction of line scanning, is represented diagrammatically in Fig. 1 of the accompanying drawings.

In the circuit of Figure 1, a resistance 1 carries a direct current $i$ derived from a centering current source. This resistance has a centre-tap 2 and a sliding contact 3.

The circuit of the line-deflection coil 5 of cathode ray tube 13, which coil is fed through a transformer 4, is connected at one end to the centre tap 2 and, at the other end, to the sliding contact 3 of resistance 1. In this manner, symmetrical adjustment of the electron-beam is ensured.

To prevent a change of resistance in the sawtooth current circuit during control, that part of the resistance 1, in the deflection circuit, is short-circuited to alternating currents by a condenser 6.

However, a circuit of this type is not so well suited for adjusting the beam in the direction of frame scanning, since the frame deflection sawtooth current is of considerably lower frequency. Consequently, the capacity of condenser 6 must be made unduly large.

The present invention has for its object to provide a simple circuit-arrangement, in which this condenser can be dispensed with.

According to the present invention, the circuit traversed by the direct current for producing the beam centring comprises the parallel-connection of two branches, one of which has two resistances connected in series, and the other of which comprises a third resistance, the circuit comprising the deflection coil or coils being connected, at one end to the junction of the two series resistances and, at the other end, to a sliding contact provided on the third resistance, the values of the said resistances being chosen such that the total resistance in the deflection coil circuit remains substantially constant for all positions of the said sliding contact.

Figure 2:
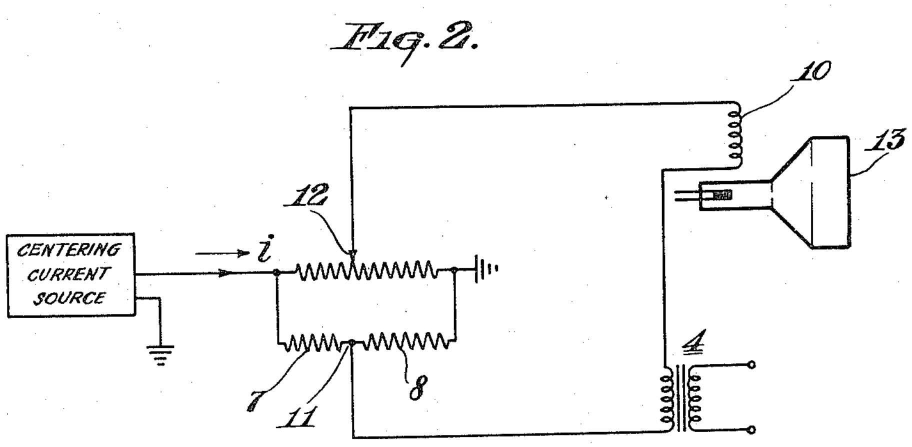

A circuit-arrangement according to the present invention is represented in Fig. 2 of the accompanying drawings, by way of example.

The direct-current circuit shown in Fig. 2 comprises the parallel-connection of one branch having two equal resistances 7 and 8 connected in series and a second branch comprising a third resistance 9.

The circuit of the deflection coil 10 of cathode ray tube 13 is connected, at one end, to the junction 11 of the resistances 7 and 8 and, at the other end, to the sliding contact 12 of resistance 9.

As the resistances 7 and 8 have equal values, this circuit similarly permits the electron-beam to be adjusted symmetrically. The values of the resistances 7, 8 and 9 are determined according to the resistance of the deflection coil or coils 10 and the circuit is such that the resistance in the deflection coil circuit remains substantially constant for all settings of the sliding contact 12. A short-circuiting condenser is therefore unnecessary.

The resistances 7, 8, 9 may be made small with respect to the resistance of deflection coil 10, in which case the variation of total resistance in the deflection circuit is very small and the resistance in the deflection circuit, viewed from the transformer 4, does not materially exceed the resistance of the deflection coils. However, the resistances values should not be made too low, in order that a sufficient controlling direct current will pass through coil 10.

For example, with a practical deflection coil resistance of approximately 80 ohms, a satisfactory operation is ensured if the three resistances 7, 8 and 9 are each given a value of 20 ohms.

In this case, the total resistance of the deflection circuit varies throughout the control range from 93.3 to 95 ohms i. e. approximately 1.5%. Such a small percentage variation proves quite permissible, since it does not cause any disturbing amplitude and linearity variations in the deflection current.

What I claim is:

1. A beam centering circuit arrangement for a cathode ray tube having a magnetic deflection coil with a given resistance value, comprising a substantially non-capacitative impedance network constituted by a first resistance element having an adjustable tapping thereon, second and third resistance elements, means intercoupling one end of each of said second and third resistance elements to define a junction and means to couple the other ends of said second and third resistance elements each to respective ends of said first resistance element, means to couple one end of said deflection coil to said adjustable tapping and the other end of said deflection coil to said junction, and means to pass a current through said first resistive element, the resistance value of each of said resistance elements being substantially lower than said given resistance value of said deflection coil.

2. A beam centering circuit arrangement for a cathode ray tube having a magnetic deflection coil with a given resistance value, comprising a substantially non-capacitative impedance network constituted by a first resistance element having an adjustable tapping thereon, second and third resistance elements, means intercoupling one end of each of said second and third resistance elements to define a junction and means to couple the other ends of said second and third resistance elements each to respective ends of said first resistance element, means to couple one end of said deflection coil to said adjustable tapping and the other end of said deflection coil to said junction, and means to pass a current through said first resistive element, each of said resistance elements having resistance values substantially equal to one quarter of said given resistance value of said deflection coil.

PETER JOHANNES HUBERTUS JANSSEN.

REFERENCES CITED

The following references are of record in the file of this patent:

UNITED STATES PATENTS

| Number | Name | Date |
|---|---|---|
| 2,223,990 | Holmes | Dec. 3, 1940 |
| 2,280,733 | Tolson | Apr. 21, 1942 |
| 2,320,551 | Bahring | June 1, 1943 |
| 2,470,197 | Torsch | May 17, 1949 |